(12) United States Patent
Hong et al.

(10) Patent No.: US 11,528,448 B1
(45) Date of Patent: Dec. 13, 2022

(54) CAMERA DEVICES AND SYSTEMS FOR VIDEO CONFERENCES

(71) Applicant: IPEVO, INC., Sunnyvale, CA (US)

(72) Inventors: Royce Yu-Chun Hong, Taipei (TW); Mu Hau Kao, Taipei (TW); Jakob Johann Reuter, Seoul (KR)

(73) Assignee: IPEVO, INC., Sunnyvale, CA (US)

( * ) Notice: Subject to any disclaimer, the term of this patent is extended or adjusted under 35 U.S.C. 154(b) by 0 days.

(21) Appl. No.: 17/379,335

(22) Filed: Jul. 19, 2021

(51) Int. Cl.
*H04N 7/14* (2006.01)
*H04N 5/225* (2006.01)
*H04N 7/15* (2006.01)

(52) U.S. Cl.
CPC ........... *H04N 7/142* (2013.01); *H04N 5/2252* (2013.01); *H04N 5/2253* (2013.01); *H04N 7/15* (2013.01)

(58) Field of Classification Search
CPC ............. H04N 7/14; H04N 7/15; H04N 5/225
USPC ............................................ 348/14.01–14.16
See application file for complete search history.

(56) References Cited

U.S. PATENT DOCUMENTS

| | | | |
|---|---|---|---|
| 9,197,856 B1* | 11/2015 | Tangeland | H04N 5/2624 |
| 2008/0129700 A1* | 6/2008 | Morrison | G06F 3/0428 |
| | | | 345/173 |
| 2012/0001999 A1* | 1/2012 | Schirdewahn | H04N 7/142 |
| | | | 348/E7.083 |
| 2019/0392630 A1* | 12/2019 | Sturm | G06T 19/006 |
| 2020/0344278 A1* | 10/2020 | Mackell | H04N 7/147 |
| 2021/0203877 A1* | 7/2021 | Erna | H04N 7/147 |

* cited by examiner

*Primary Examiner* — Melur Ramakrishnaiah
(74) *Attorney, Agent, or Firm* — K&L Gates LLP

(57) ABSTRACT

The present disclosure generally relates to a camera device and system for video conferences and method of using the same and, more particularly, a camera device and system including multiple cameras providing a wide overall view of a space and a series of narrow views of different portions of the space, and a mechanical assembly which enables the camera device and system to serve both as a video camera and also as a document camera.

19 Claims, 22 Drawing Sheets

Narrow View

Wide View

CAMERA DEVICES AND SYSTEMS FOR VIDEO CONFERENCES

TECHNICAL FIELD

The present disclosure generally relates to a camera device and system for video conferences and method of using the same and, more particularly, a camera device and system including multiple cameras providing a wide overall view of a space and a series of narrow views of different portions of the space, and a mechanical assembly which enables each of the cameras to serve both as a video camera and also as a document camera.

SUMMARY

The following summary is provided to facilitate an understanding of some of the innovative features unique to the aspects disclosed herein, and is not intended to be a full description. A full appreciation of the various aspects can be gained by taking the entire specification, claims, abstract and drawings as a whole.

In various aspects, the present disclosure provides a camera device for video conferences, especially video conferences between different conference locations. The camera device is configured to serve as both a video camera to view the overall of a space and different portions of the space, and also as a document camera to view details of a document or a work in progress such as the work (i.e., a picture or an equation) that a presenter is drawing or writing on a piece of paper or board on a table or desk.

In various aspects, the camera device for video conferences comprises: multiple cameras comprising a first camera having a wide angle lens to provide an overall/wide view of a space and a second camera having a long focus lens to provide a narrow view or a narrow view of a first portion of the space; and a mechanical assembly, wherein the first and second cameras are configured to be housed within and attached to the mechanical assembly, and wherein the mechanical assembly is configured to enable each of the multiple cameras to serve both as video cameras to provide the wide overall view and the narrow view of the space and also as a document camera to provide a close or detailed view of a document or a work in progress. The narrow view of the first portion of the space may be contained in the wide overall view of the space, such as a narrow view of the center portion of the space. The wide overall view and narrow view of the space is in a first direction different from the direction of the close or detailed view of a document in a second direction. The first direction and second direction may have an angle in a range of 0-90 degree, such as about 40-50 degree, about 45 degree, about 80-100 degree, or about 90 degree.

In various aspects, the mechanical assembly comprises a base; a camera sliding body comprising a camera housing and a plate; and a wire rail configured to attach to the base, wherein the mechanical assembly is configured to sandwich the wire rail between the camera housing and the plate, the camera housing and the plate are configured to be attached to each other, and the mechanical assembly is configured to allow the camera sliding body to slide up and down along the wire rail so that the heights of the multiple cameras are adjustable to be at different heights.

In various aspects, the first and the second cameras may be housed within and attached to the camera housing. The first and second cameras are located on the top end of the front side of the camera housing and faces the front of the camera devices.

In various aspects, the camera housing and the plate are configured to be attached to each other by screws such as two screws, a first screw at a top end and a second screw at a bottom end of the camera sliding body; or other means.

In various aspects, the camera housing further comprises a first guide configured to attach to a rear side of the camera housing facing the wire rail, the wire rail comprises two parallel sides perpendicular to a flat bottom surface of the base and a top side which is shorter than the two parallel sides, the top side includes a first notch, and the mechanical assembly is configured for the camera sliding body to slide along the wire rail through the first guide against the first notch on the wire rail and for the first guide to press against the first notch to provide friction to hold the camera sliding body in position so that the camera sliding body can sit stably (without sliding down when no external force is applied to the camera device) at any locations along the wire rail.

In various aspects, the camera housing further comprises a second guide configured to attach to the rear side of the camera housing facing the wire rail, the top side of the wire rail includes a second notch, the second guide is configured to fit into the second notch of the wire rail to keep the camera sliding body vertically centered on the wire rail.

In various aspects, the first guide is made of a polymer including a plastic polymer, an elastomer and a rubber, such as a polyurethane elastomer or other polymers having a coefficient of friction higher than 0.2 as measured according to the ASTM D1894 standard.

In various aspects, the first guide is made of a polyurethane elastomer having a high coefficient of friction higher than 0.2, for example, a kinetic coefficient of friction in a range of about 0.2-2.5 and a static coefficient of friction in a range of about 0.3-2.5 as measured according to the ASTM D1894 standard.

In various aspects, the second guide is made of a polymer such as a polycarbonate polymer.

In various aspects, the mechanical assembly is configured to enable the camera sliding body to flip to the front of the camera device at an angle in a range of about 0-90° from the original position of the camera sliding body when the camera sliding body slides to the top end of the wire rail. As used herein, the term "front" of the camera device means the direction that the cameras are facing. The "front side" of the camera device means the side where the cameras are located and the "rear side" of the camera device means the side opposite to the front side.

In various aspects, the mechanical assembly is configured to enable the camera sliding body to flip or bend to the front at a flipping or bending angle in a range of about 0-90° from the original position of the camera sliding body when the camera sliding body slides to the top end (the highest position) of the wire rail, and to stop at a flipping angle in a range of about 0-90°, preferably in a range of about 30-90° from the original position of the camera sliding body.

In various aspects, the mechanical assembly is configured to enable the camera sliding body to flip to the front and stop at the flipping angle of about 45° from the original position of the camera sliding body.

In various aspects, the mechanical assembly is configured to enable the camera sliding body to flip to the front and stop at the flipping angle of about 90° from the original position of the camera sliding body.

In various aspects, the camera housing comprises a pin and a U shape loop both of which are configured to attach to the camera housing, and the pin is fixedly placed inside the loop, the pin and the U shape loop are configured to enable the camera sliding body to stop at the flipping angle of about 40-50° and preferably about 45° from the original position of the camera sliding body. In an embodiment, the U shape loop is fixedly attached to the camera housing. In an embodiment, the U shape loop is configured to be able to rotate the pin.

In various aspects, the camera housing comprises two side wings, and the mechanical assembly is configured so that two bottom edges of the two side wings of the camera housing enable the camera sliding body to stop at the flipping angle of about 80-100°, and preferably about 90° from the original position of the camera sliding body.

In various aspects, the camera device may further comprise a third camera having a long focus lens configured to be housed within and attached to the camera housing to provide a narrow view of a second portion of the space. The narrow view of the second portion of the space overlaps and is different from the narrow view of the first portion of the space. The narrow view of the first portion of the space is contained within the wide overall view of the space, and maybe the narrow view of the center portion of the space. The narrow view of the second portion of the space may be partially or wholly contained within the wide overall view of the space or may be extend horizontally or vertically beyond the wide overall view of the space such as the corners of the space.

In various aspects, the camera device may further comprise a fourth camera having a long focus lens configured to be housed within and attached to the camera housing to provide a narrow view of a third portion of the space. The narrow view of the third portions of the space may overlap with but is different from the narrow view of the first portion of the space, and may or may not overlap with and is different from the narrow view of the second portion of the space. The narrow view of the third portion of the space may be partially or wholly contained within the wide overall view of the space or may be extend horizontally or vertically beyond the wide overall view of the space such as the corners of the space. The narrow view of the first portion of the space is between the narrow view of the second and third portions of the space.

In various aspects, the present disclosure provides a camera system for video conferences, the camera system comprising: a camera device disclosed herein above or elsewhere in the present specification, the camera device comprising multiple cameras including a first camera having a wide angle lens to provide a wide overall view of a space and a second camera having a long focus lens to provide a narrow view of a first portion of the space, and a mechanical assembly, wherein the multiple cameras are configured to be housed within and attached to the mechanical assembly; and a processor operatively coupled to each of the multiple cameras, wherein the mechanical assembly is configured to enable each of the multiple cameras to serve both as video cameras to provide wide and narrow views of the space and also as document cameras to provide a close view of a document or a work in progress or process such as the work that a presenter is drawing or writing on a piece of paper or board on a desk or a table.

In various aspects, the first camera is configured to produce a first video signal and the second long camera is configured to produce a second video signal; and wherein the processor is configured to: receive the first and second video signals, select a relevant video signal from the first and second video signals, and process the relevant video signal by digitally panning, tilting, and zooming of the relevant video signal to generate a video stream from the processed video signals.

In various aspects, the processor is further configured to control the camera device to track a talking participant and to follow the tracked talking participant during the video conferences.

In various aspects, the multiple cameras further comprise a third camera having a long focus lens configured to output a third video signal and optionally a fourth camera having a long focus lens configured to output a fourth video signal, and wherein the processor is configured to: receive the third and fourth video signals; select a first relevant video signal and a second relevant video signal from the first video signal, the second video signal, the third video signal, and the fourth video signal, the second relevant video signal being different from the first relevant signal; and generate a dual stream video stream including a first stream generated based on the first relevant video signal and a second stream generated based on the second relevant video signal.

In various aspects, the present disclosure also provides a camera system for video conferences, especially video conferences between different conference locations. The camera system includes the camera device disclosed herein above and elsewhere in the present disclosure; and a processor operatively coupled to each of the multiple cameras or lens. Each of the cameras is configured to produce a video signal and the processor is configured to receive the video signals and select a relevant video signal from the video signals. The processor is also configured to process the relevant video signal by digitally panning, tilting, and zooming of the relevant video signal to generate a video stream from the processed video signal. The processor is further configured to control the camera device to follow a moving subject such as a presenter or track and follow a talking participant during the video conferences.

In various aspects, the camera system comprises the camera device disclosed herein above and further comprises a processor. The camera device comprises the multiple cameras which include a first camera having a wide angle lens and a second camera having a long focus lens. The first camera is configured to provide a wide overall view of a space and to output a first video signal. The second camera having a long focus lens provides a narrower view of a first portion of the space and to output a second video signal. The first camera and the second camera collectively serve as single camera for a video conference system and the perspective views provided by the cameras provides coverage for a variety of video conference settings with high quality images over the camera system's full working range.

In an embodiment, the multiple cameras of the camera system may further comprise a third camera having a long focus lens which is configured to output a third video signal, and optionally a fourth camera having a long focus lens which is configured to output a forth video signal.

In various aspects, the processor is operatively coupled to the multiple cameras or lens, and is configured to receive the first video signal and the second video signal, and optionally the third and/or forth video signals. The processor is also configured to select a relevant video signal from the first video signal and the second video signal, and optionally the third and/or forth video signals, process the relevant video signal by digitally panning, tilting, and zooming the relevant video signal to produce a processed video signal, and output a video stream from the processed video signal.

The features and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the claimed subject matter.

Additional features and advantages are described herein, and will be apparent from the following Detailed Description and the figures.

BRIEF DESCRIPTION OF THE DRAWINGS

Various features of the aspects described herein are set forth with particularity in the appended claims. The various aspects, however, both as to organization and methods of operation, together with advantages thereof, may be understood in accordance with the following description taken in conjunction with the accompanying drawings as follows:

Figures 1A, 1B:
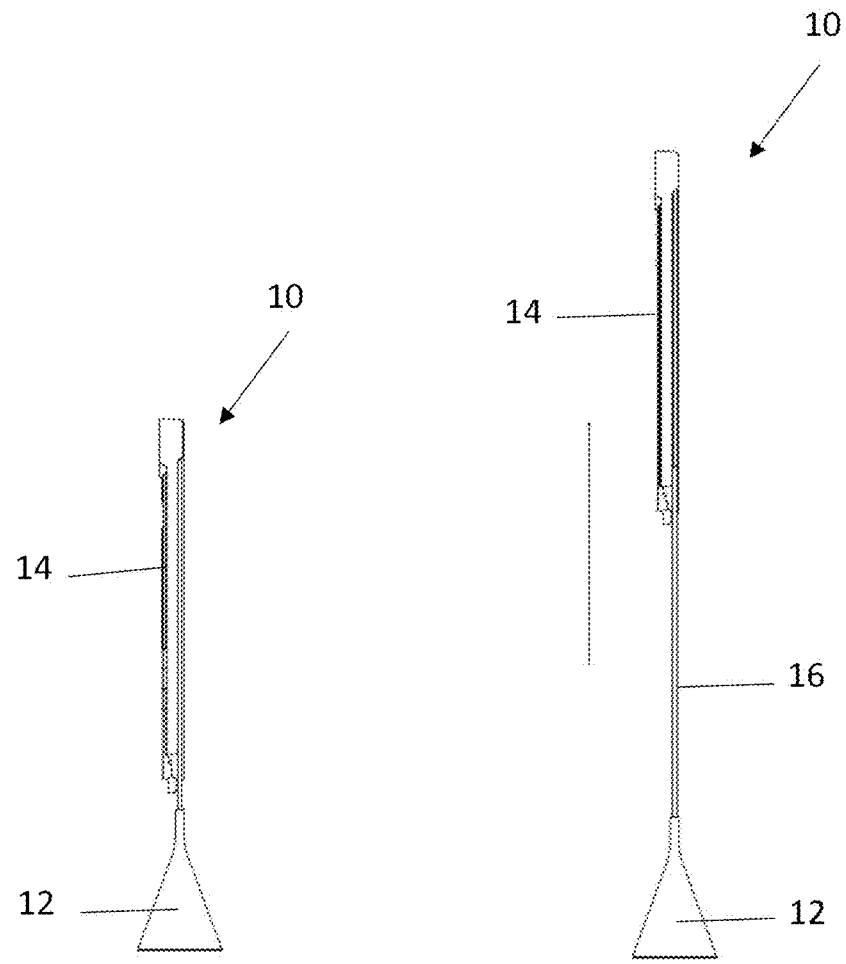
FIGS. 1A to 1D show one embodiment of the camera device at four different configurations respectively, in accordance with at least one non-limiting aspect of the present disclosure.

Corresponding reference characters indicate corresponding parts throughout the several views. The exemplifications set out herein illustrate various aspects of the present disclosure, in one form, and such exemplifications are not to be construed as limiting the scope of the claimed subject matter in any manner.

DETAILED DESCRIPTION

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims. Furthermore, it is to be understood that such terms as "forward", "rearward", "left", "right", "upwardly", "downwardly", "top", "bottom", "upper", "lower", "front", "rear", "side", "height", "length", "width", "interior", "exterior", "inner", "outer", "depth", "inside", "outside", and the like are words of convenience and are not to be construed as limiting terms. In the following description, like reference characters designate like or corresponding parts throughout the several views of the drawings.

Before explaining various aspects of the articulated manipulator in detail, it should be noted that the illustrative examples are not limited in application or use to the details of disclosed in the accompanying drawings and description. It shall be appreciated that the illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof.

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

All numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

As used in this disclosure and the appended claims, the singular forms "a," "an" and "the" include plural referents unless the context clearly dictates otherwise. Thus, for example, reference to "a component" or "the component" includes two or more components.

The words "comprise," "comprises" and "comprising" are to be interpreted inclusively rather than exclusively. Likewise, the terms "include," "including," "containing" and "having" should all be construed to be inclusive, unless such a construction is clearly prohibited from the context. Further in this regard, these terms specify the presence of the stated features but not preclude the presence of additional or further features.

Nevertheless, the devices and methods disclosed herein may lack any element that is not specifically disclosed herein. Thus, a disclosure of an embodiment using the term "comprising" is (i) a disclosure of embodiments having the identified components or steps and also additional components or steps, (ii) a disclosure of embodiments "consisting essentially of" the identified components or steps, and (iii) a disclosure of embodiments "consisting of" the identified components or steps. Any embodiment disclosed herein can be combined with any other embodiment disclosed herein.

The term "and/or" used in the context of "X and/or Y" should be interpreted as "X," or "Y," or "X and Y." Similarly, "at least one of X or Y" should be interpreted as "X," or "Y," or "X and Y." For example, "at least one of monobasic sodium phosphate or dibasic sodium phosphate" should be interpreted as "monobasic sodium phosphate," or "dibasic sodium phosphate," or "both monobasic sodium phosphate and dibasic sodium phosphate."

Where used herein, the terms "example" and "such as," particularly when followed by a listing of terms, are merely exemplary and illustrative and should not be deemed to be exclusive or comprehensive. Any embodiment disclosed herein can be combined with any other embodiment disclosed herein unless explicitly indicated otherwise.

A camera system for video conferences allow meetings between persons or groups of people at different locations. For example, certain video conferences include endpoints that are equipped with multiple cameras and multiple displays configured to capture and present, respectively, different video streams. The video streams can be classified as participant streams (i.e., video captured by cameras and containing views of meeting participants) or data content streams (i.e., computer generated graphical content presented by meeting participants).

In various aspects, the camera device includes multiple cameras to provide a wide view of a space and a series of narrow views of different portions of the space. In various aspects, the camera device is further configured to be used as a document camera. In various aspects, the camera device further comprises a mechanical assembly which enables the camera device to serve both as a video camera to provide wide or narrow views of the space and also as a document camera to provide a close view of a document or details of an item.

In various aspects, the multiple cameras include a first camera having a wide angle lens and a second camera having a long focus lens. The first camera is configured to provide the wide overall view of the space. The second camera provides a narrower view of a first portion of the space. The camera device may optionally comprise a third camera having a long focus lens. In an embodiment, the camera device is configured or controlled to follow a moving subject such as a presenter or to track and follow a talking participant during the video conferences.

In various aspects, the camera device further comprises a mechanical assembly configured to enable the camera device to be used as a document camera to provide a close view or details of a document or an item. In an embodiment, the mechanical assembly comprises a base, a camera sliding body and a wire rail. The camera sliding body comprises a camera housing and a plate. The multiple cameras are housed within and are configured to attach to the camera housing. The wire rail is configured to attach to the base. The camera device is further configured to sandwich the wire rail between the camera housing and the plate. The camera housing and the plate are configured to attached to each other, for example, by a screw at each of top and bottom ends. The camera sliding body (comprising the attached camera housing and the plate) is configured to be able to slide up and down along the longer length direction of the wire rail so that the multiple cameras can be adjusted to be positioned at different heights.

In various aspects, the mechanical assembly may further comprise a first guide and a second guide both of which are configured to attach to the camera housing. The wire rail comprises two parallel sides perpendicular to a flat bottom surface of the base. The mechanical assembly is configured for the camera sliding body (comprising the camera housing and the plate) to slide along the longer length direction of the wire rail through the first guide and the second guide. The mechanism assembly is further configured so that the camera sliding body can sit stably (without sliding down) at any locations along the wire rail when no external force is applied to the mechanical assembly, such as through friction between the first and/or second guides and the wire rail.

In an embodiment, the first guide and/or the second guide is configured to comprise a locking assembly such as a series of depressible pins on the one or both of the guides. The mechanical assembly is configured to enable the depressible pins to be in a depressed state so the guides are smooth and can slide smooth up and down along the wire rail; and to enable the depressible pins to be in an extruded state so the guides can be locked in position by the extruded pins on top of the top side of the wire rail. The mechanism assembly is configured so that the camera sliding body can slide along the wire rail; stop at any position (heights) of the wire rail; and further can sit stably (without sliding down when no external force is applied to the camera device) at different locations (heights) along the wire rail through the locking assembly on the first and/or second guides.

In an embodiment, the wire rail has three sides, two parallel sides on the longer length direction perpendicular to the bottom surface of the base and one shorter top side perpendicular to the two parallel sides. The top side of the wire rail has a first notch and a second notch. The first guide is configured to press against the first notch to provide friction to hold the camera sliding body in position. The first guide is made of a polymer, preferably a polyurethane polymer. In an embodiment, the polyurethane may have a kinetic coefficient of friction in a range of about 0.1-3, about 0.2-2.5, or preferably about 0.2-2.0 as measured according to the ASTM D1894 standard test method. In an embodiment, the polyurethane may have a static coefficient of friction in a range of about 0.1-4, about 0.2-3.0, about 0.2-2.5, about 0.3-2.5, about 0.4-2.5, or preferably about 0.5-2.5 as measured according to the ASTM D1894 standard test method. The second guide is configured to fit into the second notch of the wire rail to keep the camera sliding body vertically centered on the wire rail. The second guide is made of a polymer, preferably a polycarbonate polymer. The movement of the camera sliding body along the two parallel sides of the wire rail is through sliding the two guides against the two notches of the top side of the wire rail.

In an embodiment, the wire rail has two parallel sides perpendicular to the flat bottom surface of the base. The first guides have a first groove and the second guide has a second groove. The two sides of the wire rail is configured to push into the first and second grooves respectively. The camera sliding body can slide along the two parallel sides of the wire rail inside the grooves of the first and second guides.

In various aspects, the mechanical assembly is further configured for the camera sliding body to be able to bend/flip at different angles when sliding to the top end of the wire rail; and further for the camera sliding body to be able to stop at a bending/flipping angle in a range of 0-90° from the original position of the camera sliding body, such as a bending/flipping angle of about 10°, about 15°, about 20°, about 25°, about 30°, about 35°, about 40°, about 45°, about 50°, about 55°, about 60°, about 65°, about 70°, about 75°, about 80°, about 85° and about 90°, and preferably about 45° and about 90° from the original position of the camera sliding body. In an embodiment, the camera housing comprises a pin and a U shape loop and the pin is attached to the camera housing. The pin and the U shape loop are configured so that the pin and the U shape loop are attached to the camera housing and the pin is placed inside the loop and the loop is attached to the pin. The pin and the U shape loop are configured to enable the camera sliding body to stop at the bending/flipping angle of about 45° from the original position of the camera body. In an embodiment, the edge of the camera housing enables the camera sliding body to stop at the bending/flipping angle of about 90° from the original position of the camera sliding body. In an embodiment, the camera housing comprises two side wings, and the bottom edges of the side wings enables the camera sliding body to stop at the bending/flipping angle of about 90° from the original position of the camera sliding body.

In various aspects, the present disclosure also provides a camera system for video conferences, especially video conferences between different conference locations. The camera system includes the camera device disclosed herein above and elsewhere in the present disclosure; and a processor operatively coupled to each of the multiple cameras or lens. Each of the cameras is configured to produce a video signal and the processor is configured to receive the video signals and select a relevant video signal from the video signals. The processor is also configured to process the relevant video signal by digitally panning, tilting, and zooming of the relevant video signal to generate a video stream from the processed video signal. The processor is further configured to control the camera device to follow a moving subject such as a presenter or track and follow a talking participant during the video conferences.

In various aspects, the present disclosure provides a camera system. The camera system comprises the camera device disclosed herein above and further comprises a processor. The camera device comprises the multiple cameras which include a first camera having a wide angle lens and a second camera having a long focus lens. The first camera is configured to provide a wide view of a space and to output a first video signal. The second camera having a long focus lens provides a narrower view of the space and to output a second video signal. The first and second cameras collectively serve as single camera for a video conference system and the perspective views provided by the cameras provides coverage for a variety of video conference settings with high quality images over the camera system's full working range.

In an embodiment, the multiple cameras of the camera system may further comprise a third camera having a long focus lens which is configured to output a third video signal, and optionally a fourth camera having a long focus lens which is configured to output a forth video signal.

In various aspects, the processor is configured control one of the multiple cameras to follow a moving subject in the space such as a presenter, or to track a talking participant and follow the tracked talking participant during the video conferences.

In various aspects, the processor is operatively coupled to the multiple cameras or lens, and is configured to receive the first video signal and the second video signal, and optionally the third or fourth video signals. The processor is also configured to select a relevant video signal from the first video signal and the second video signal, and optionally the third and/or forth video signals, process the relevant video signal by digitally panning, tilting, and zooming the relevant video signal to produce a processed video signal, and output a video stream from the processed video signal.

Example Embodiments

Figure 1C:
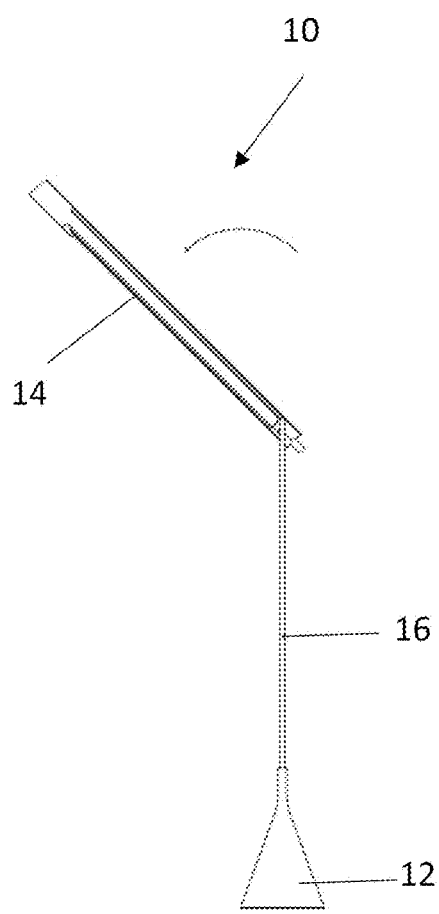
Figure 1D:
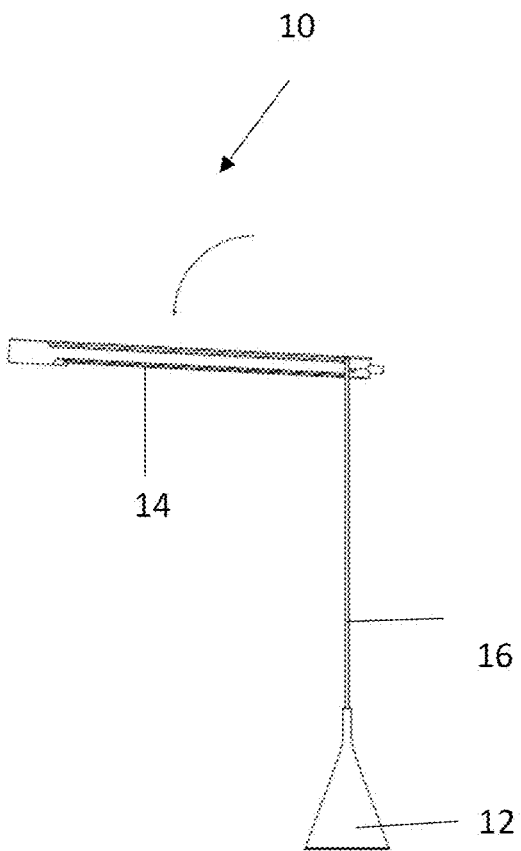

Reference now to FIG. 1, a camera device 10, according to the present disclosure is provided. The camera device 10 includes a base 12, a camera sliding body 14, and a wire rail 16. FIG. 1A shows the camera device 10 in its shortest position where the camera sliding body 14 slides down to the bottom end of the wire rail 16. FIG. 1B shows the camera device 10 in its fully extended (highest) position where the camera sliding body 14 slides up to the top end of the wire rail 16. FIG. 1C shows the camera device 10 with the camera sliding body 14 at its fully extended position and with a bending/flipping angle of around 45° from its originally position. FIG. 1D shows the camera device 10 with the camera sliding body 14 at its fully extended position and with a bending/flipping angle of around 90° from its originally position.

Figure 2A:
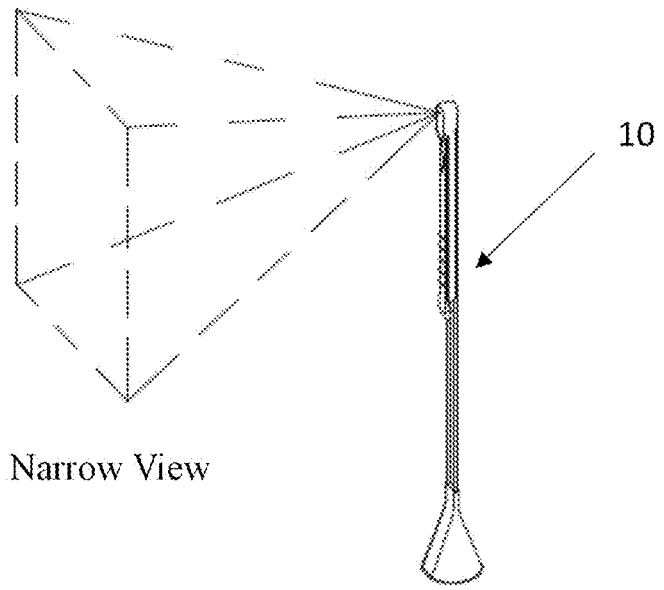
FIGS. 2A to 2B show one embodiment of the camera device in a video camera mode with narrow and wide views of a space respectively, in accordance with at least one non-limiting aspect of the present disclosure.
Figure 2B:
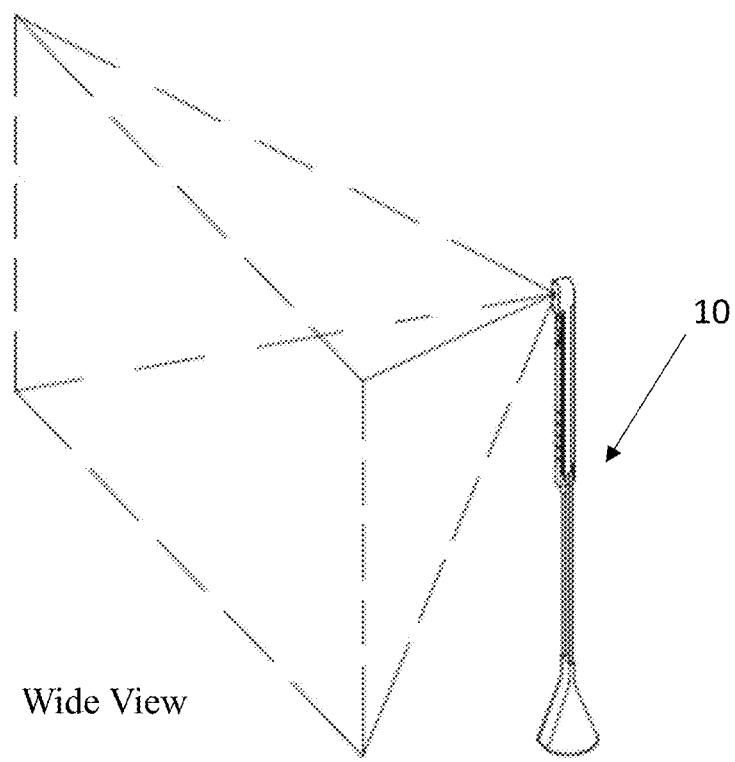

Reference now to FIG. 2, a camera device 10 with different views of the space, according to the present disclosure is provided. FIG. 2A shows the camera device 10 having the narrow view of the space. FIG. 2B shows the camera device 10 having the narrow view of the space.

Figure 3A:
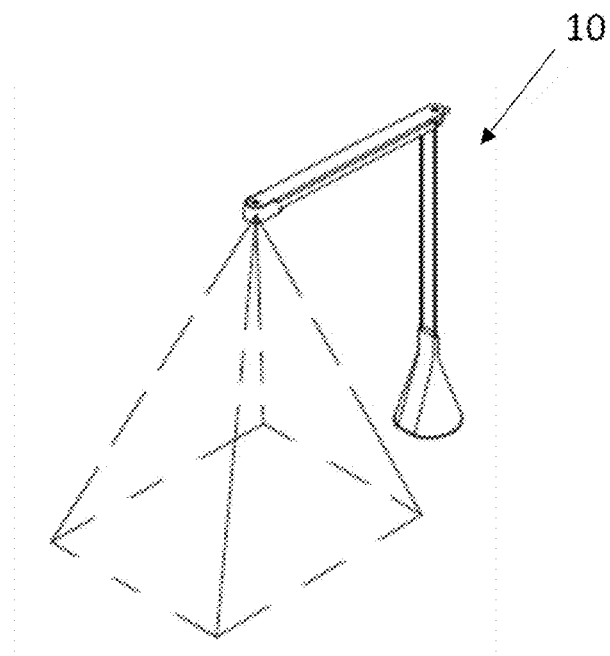
FIGS. 3A to 3B show one embodiment of the camera device in document camera mode with narrow and wide views, in accordance with at least one non-limiting aspect of the present disclosure.
Figure 3B:
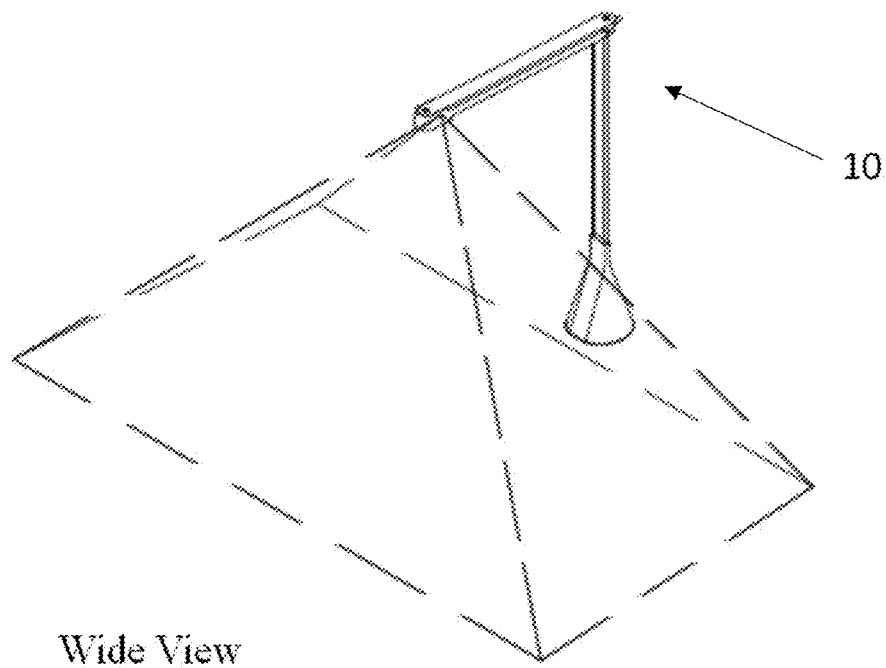
Figure 4A:
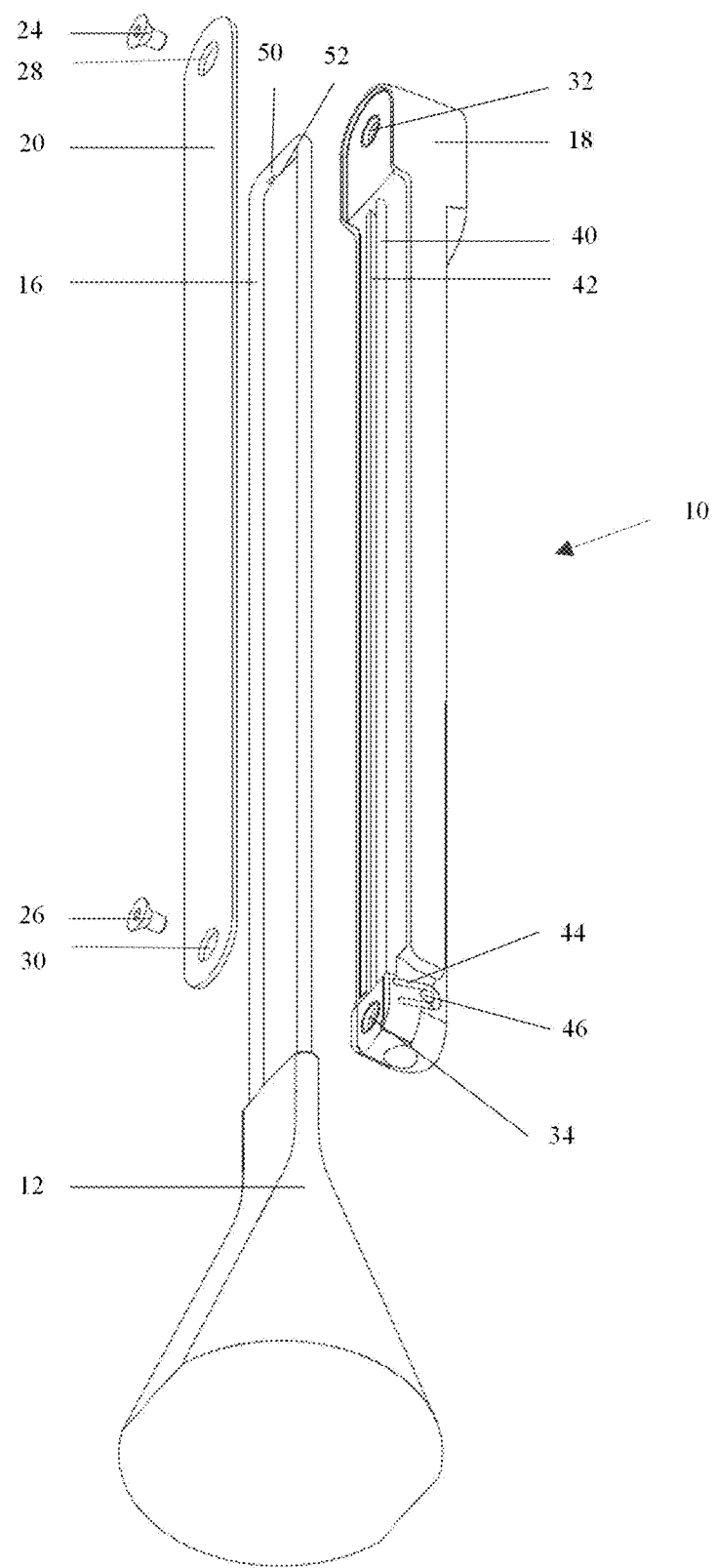
FIGS. 4A to 4D show one embodiment of the camera device with the detailed components and their relevant space relationship, in accordance with at least one non-limiting aspect of the present disclosure.
Figure 4B:
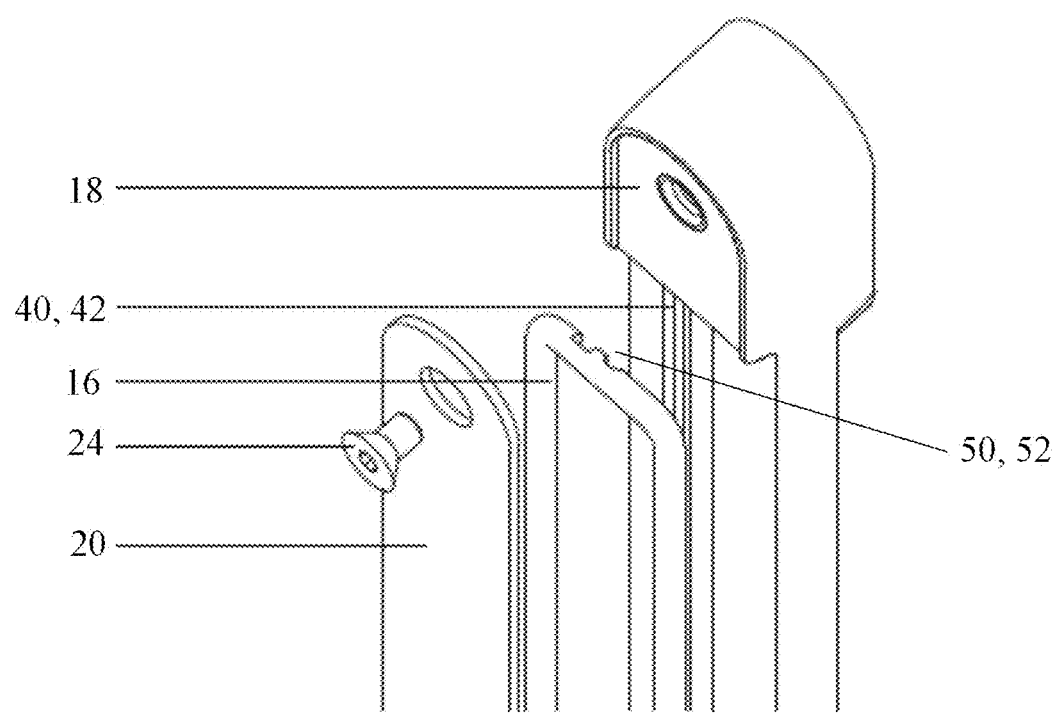
Figure 4C:
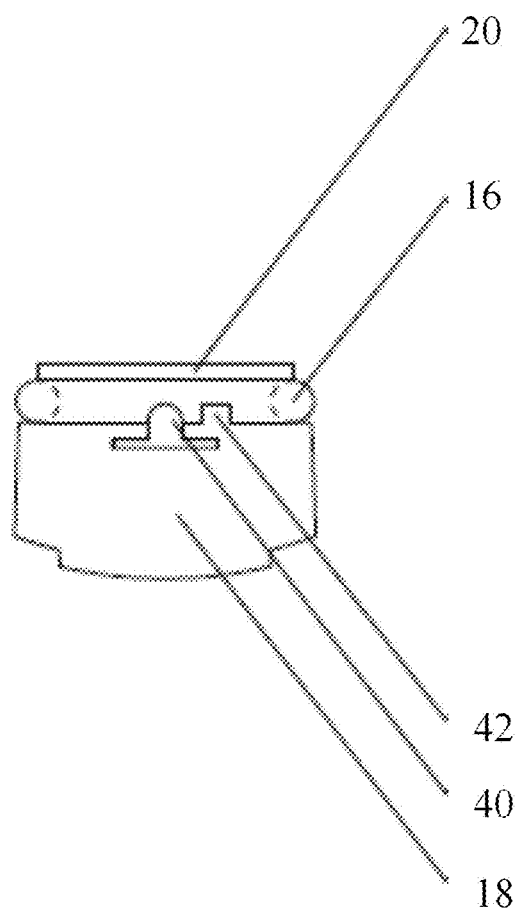
Figure 4D:
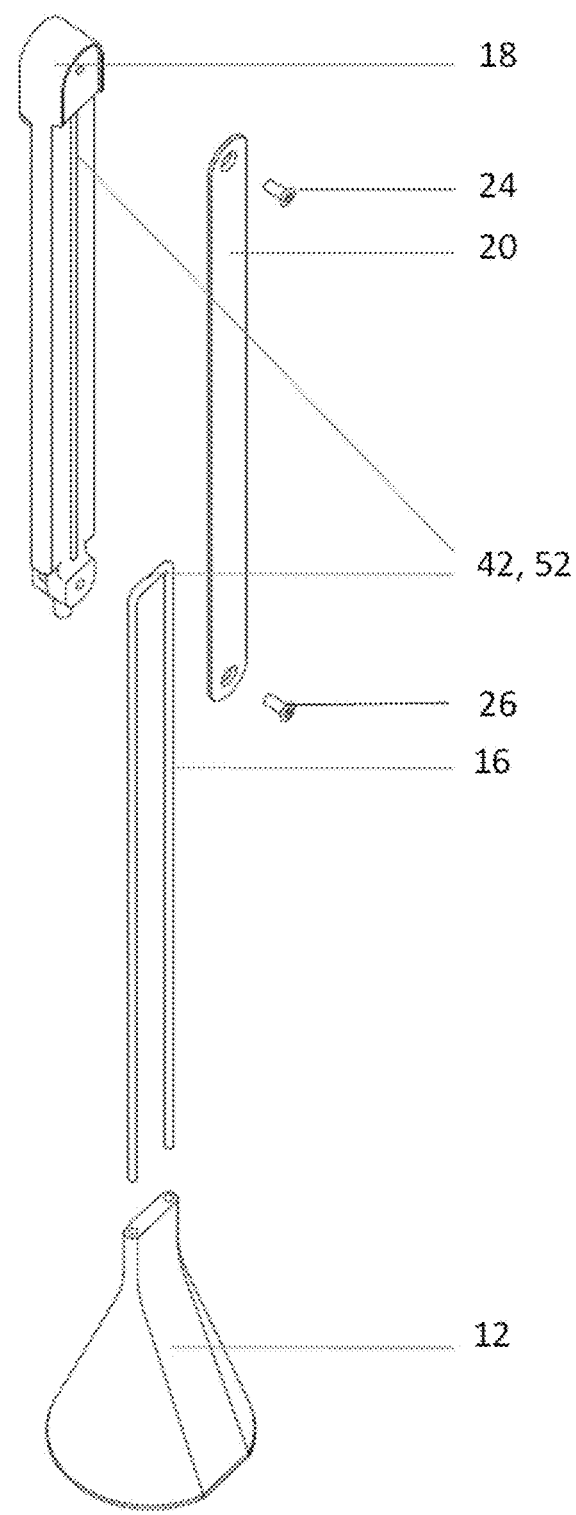

Reference now to FIG. 3, a camera device 10 in its document module with different views of the space, according to the present disclosure is provided. FIG. 3A shows the camera device 10 having the narrow view of the space which is used as a document camera to provide a close or detailed view of a document or an item. FIG. 3B shows the camera device 10 having the narrow view of the space which is used as a document camera to provide a close or detailed view of a document or an item.

Reference now to FIG. 4, a camera device 10 with detailed view of the components, according to the present disclosure is provided. As shown in FIGS. 4A to 4D, the camera device 10 comprises multiple cameras (not shown), a base 12; a camera sliding body 14 which further includes a camera housing 18 and a plate 20; and a wire rail 16 configured to attach to the base 12. The multiple cameras are configured to be housed within and fixed to the camera hosing 18. The wire rail 16 comprises two parallel sides and a top short side. The wire rail 16 is configured to be sandwiched between the camera housing 18 and the plate 20. The camera housing 18 and the plate 20 are configured to attach to each other, for example, through screwing two screws 24, 26 into two holes 28, 30 on the plate 20 and further into two holes 32, 34 on the camera housing 18. The camera housing 18 comprises a first guide 40 and a second guide 42. The wire rail comprises a first notch 50 and a second notch 52 both of which are on the top short side of the wire rail. The first guide 40 is made of a polyurethane (PU) elastomer, and is configured to press against the first notch 50 in the wire to provide friction to hold the camera sliding body 14 in place at different heights of the wire rail. The second guide 42 is made of a polycarbonate (PC) polymer, and is configured to fit into the second notch 52 in the wire rail 16 to keep the camera sliding body 14 centered on the wire rail 16. The plate 20 is a metal plate. The wire rail 16 is a metal wire rail. The base 12 is dies cast metal base. The camera housing 18 further comprises a pin 46 and a U shape loop 44 both of which are configured to attach and fixed to the camera housing 18. The pin 46 is configured to be placed inside the U shape loop 44.

Figure 5A:
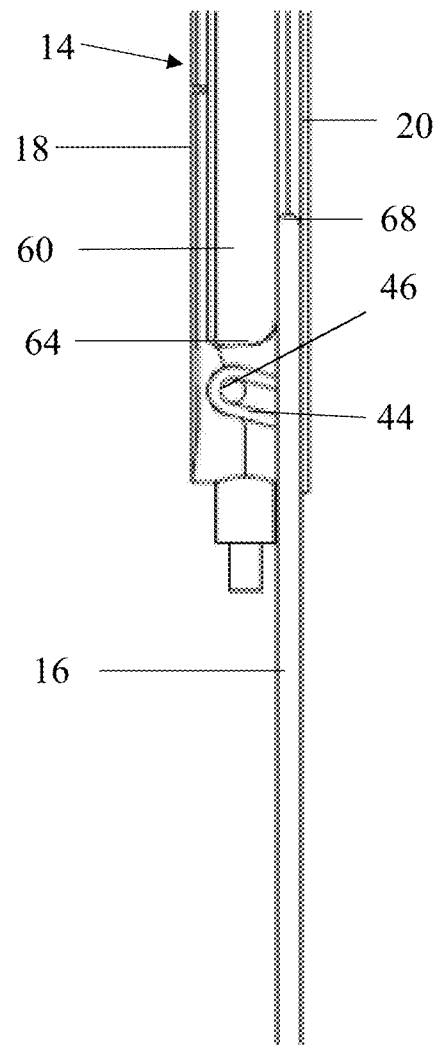
FIGS. 5A to 5D show one embodiment of the details of the pin and the U shape loop of the camera device, in accordance with at least one non-limiting aspect of the present disclosure.
Figure 5:
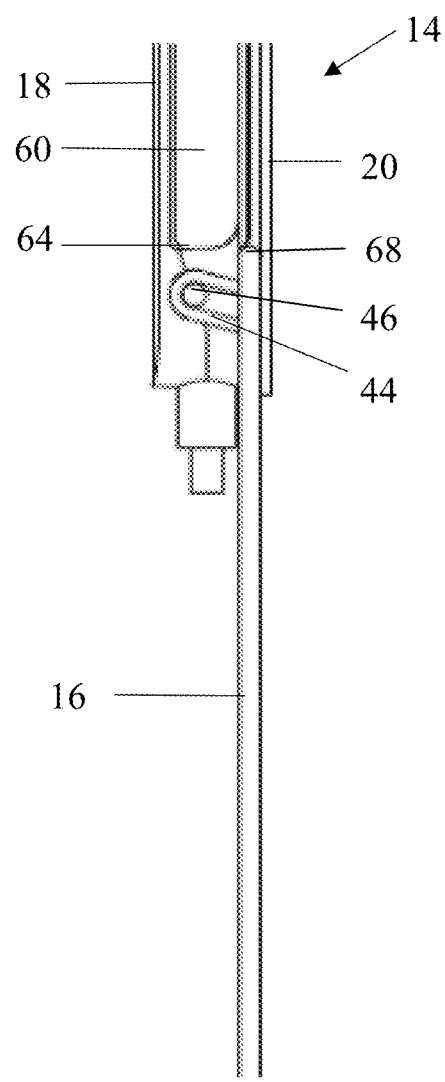
Figure 5C:
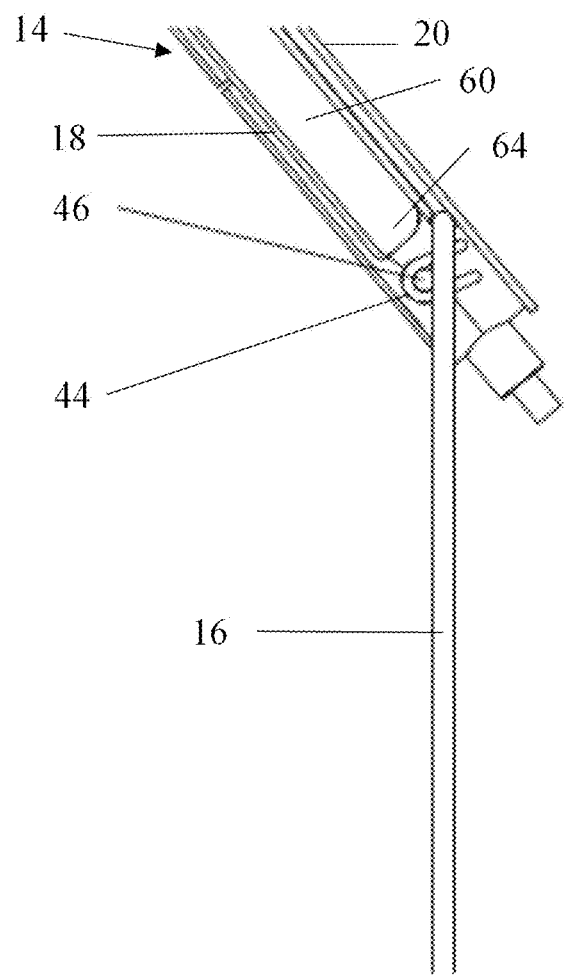
Figure 5D:
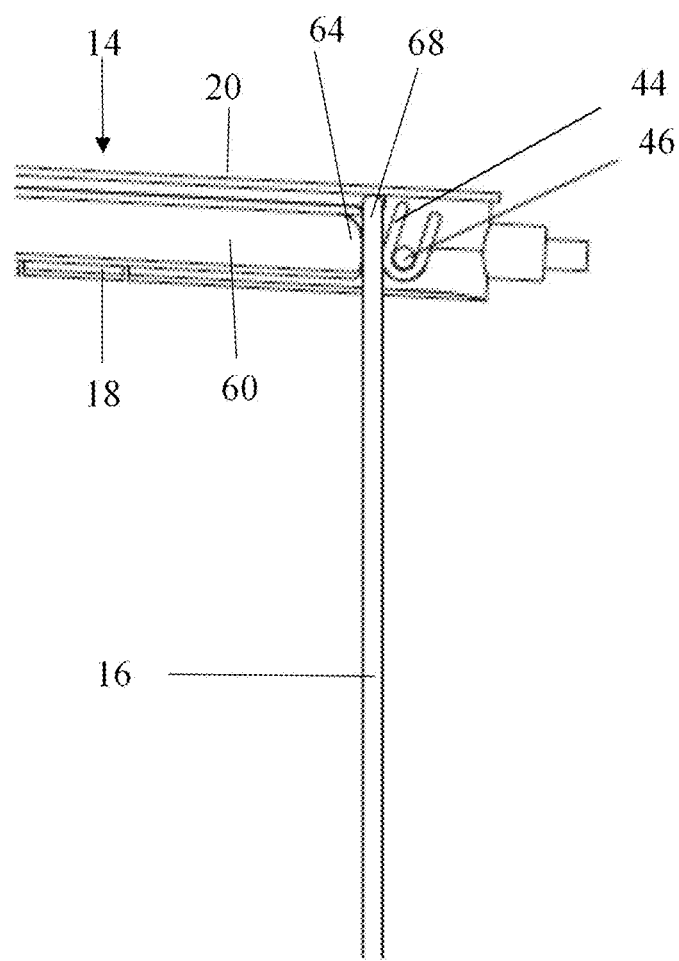
Figure 6A:
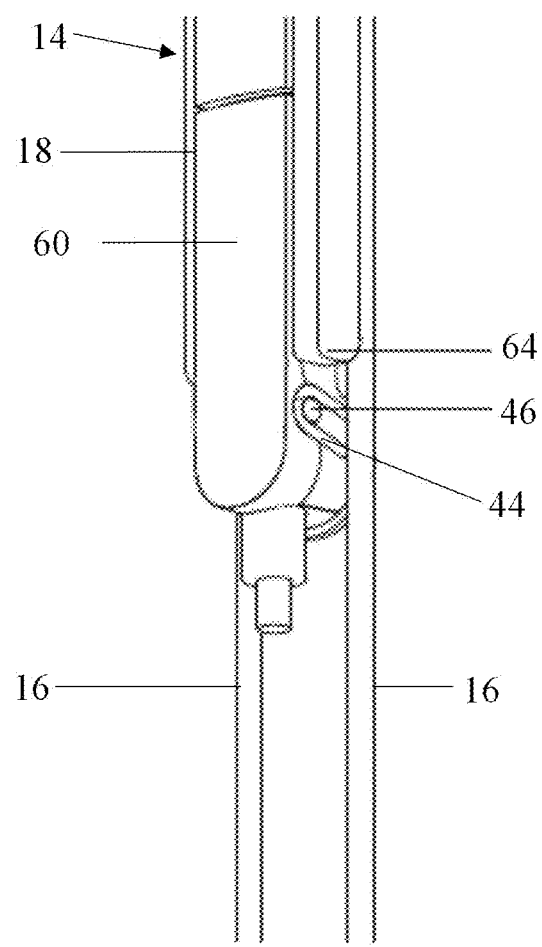
FIGS. 6A to 6C show one embodiment of the configuration of the camera device, in accordance with at least one non-limiting aspect of the present disclosure.
Figure 6B:
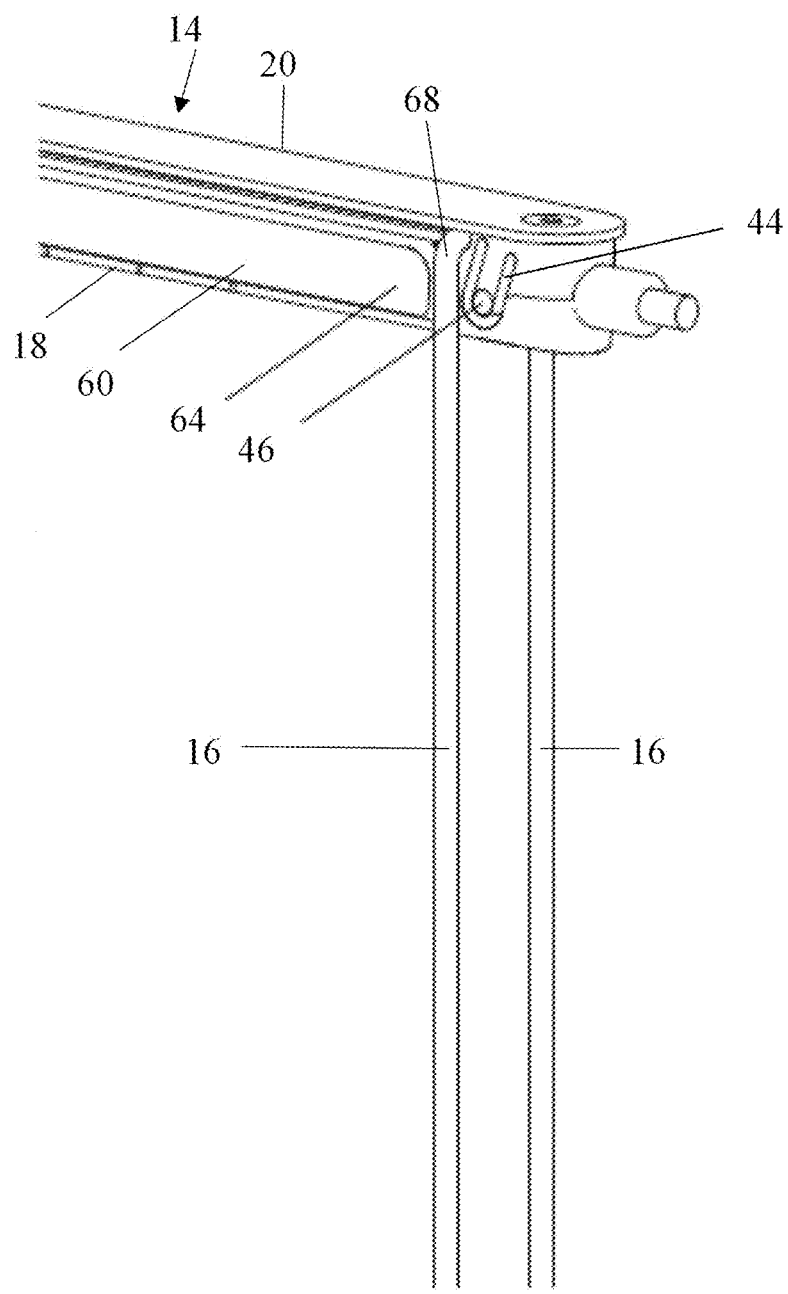
Figure 6C:
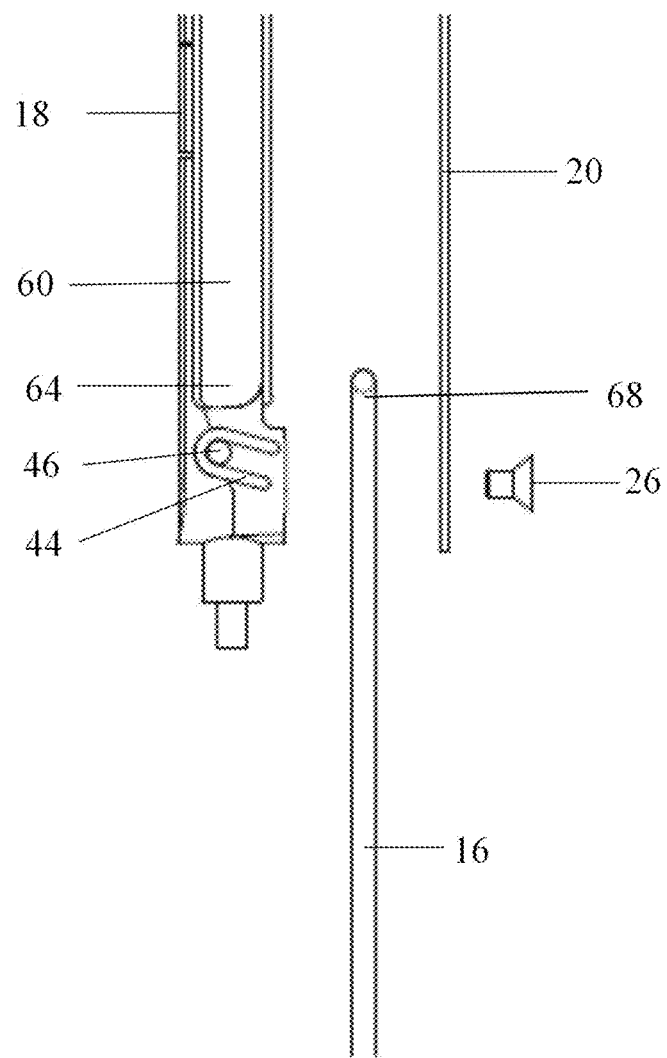

Reference now to FIGS. 5 and 6, a camera device 10 showing details of the pin 46 and the U shape loop 44, according to the present disclosure is provided. As shown in FIGS. 5A to 5D and 6A to 6C, the camera housing 14 further comprises two side wings 60, 62 (only showing one side wing 60) each having a bottom edge 64, 66 (showing one bottom edge 64). When the camera sliding body 14 slides to the top end 68 of the wire rail 16, the camera sliding body 14 can be flipped to the front. The pin 46 and the U shape loop 44 are configured to stop the camera sliding body 14 at a flipping angle of about 45 degree, so the camera sliding body 14 can stay stably at the flipping angle of about 45 degree from its original position without substantially changing the flipping angle when no external force is applied to the camera device 10. The camera sliding body 14 can be further flipped to a flipping angle of about 90 degree from its original position. The edge 64 of the camera housing 18 stops the camera sliding body 14 at the flipping angle of about 90 degree and stay stably at the flipping angle of about 90 degree without substantially changing the flipping angle when no external force is applied to the camera device 10.

Figure 7A:
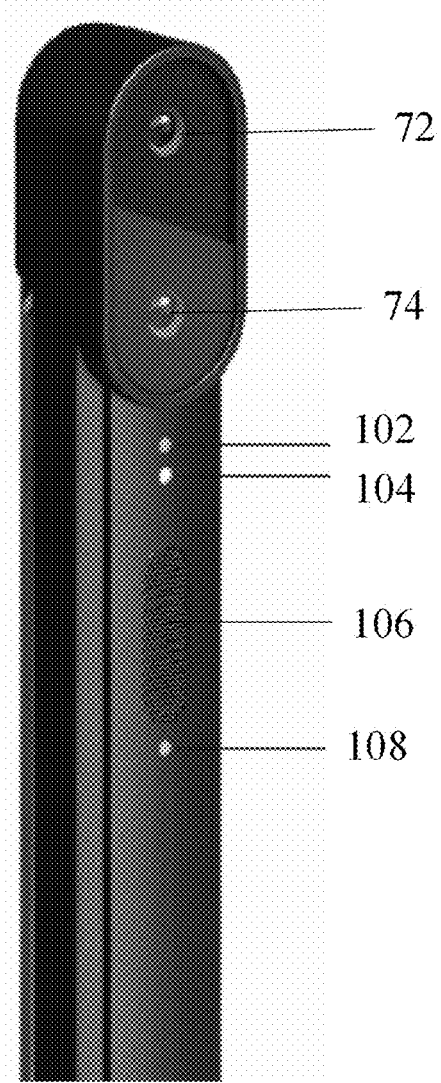
FIGS. 7A to 7C show one embodiment of the control panel of the camera device, in accordance with at least one non-limiting aspect of the present disclosure.
Figure 7B:
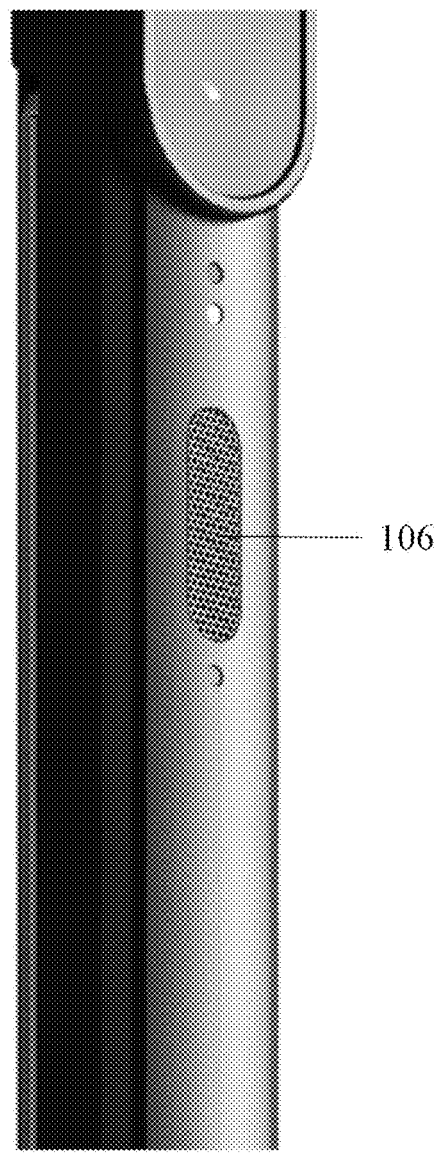
Figure 7C:
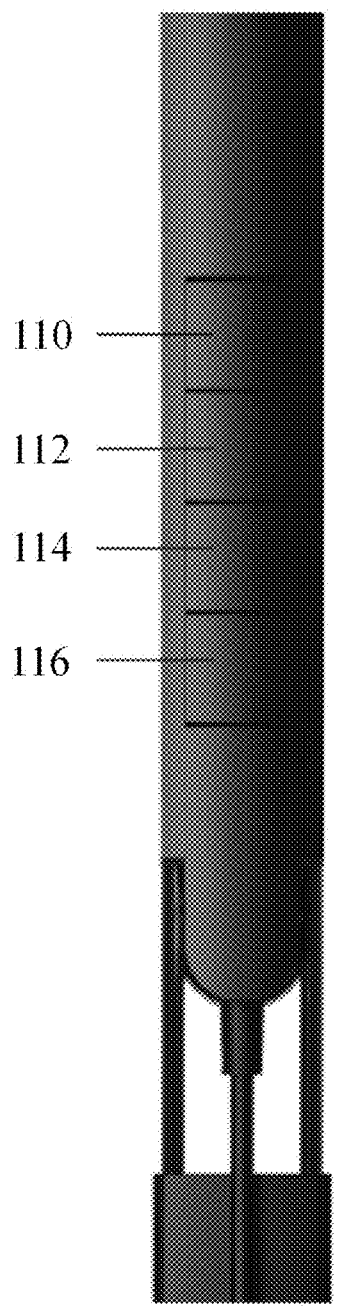
Figure 8A:
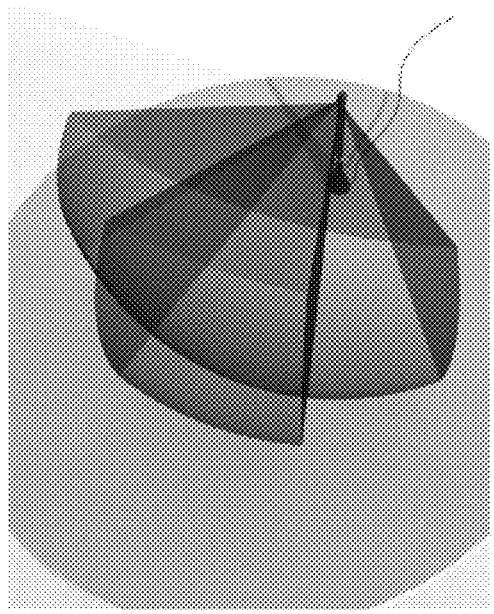
FIGS. 8A to 8D show one embodiment of the camera device in video camera mode with narrow and wide views, in accordance with at least one non-limiting aspect of the present disclosure.
Figure 8B:
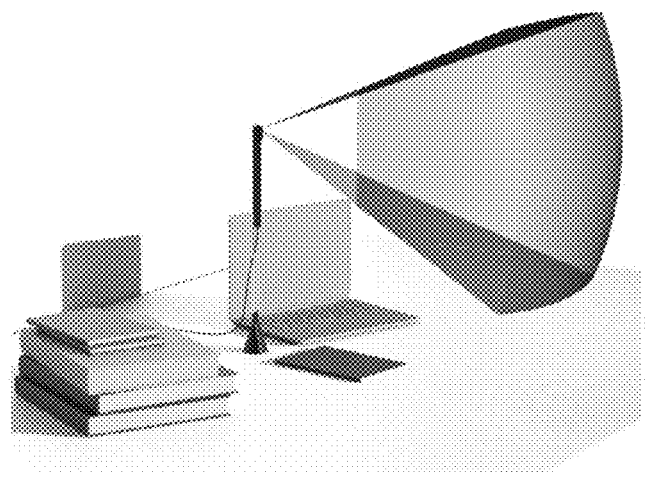
Figure 8C:
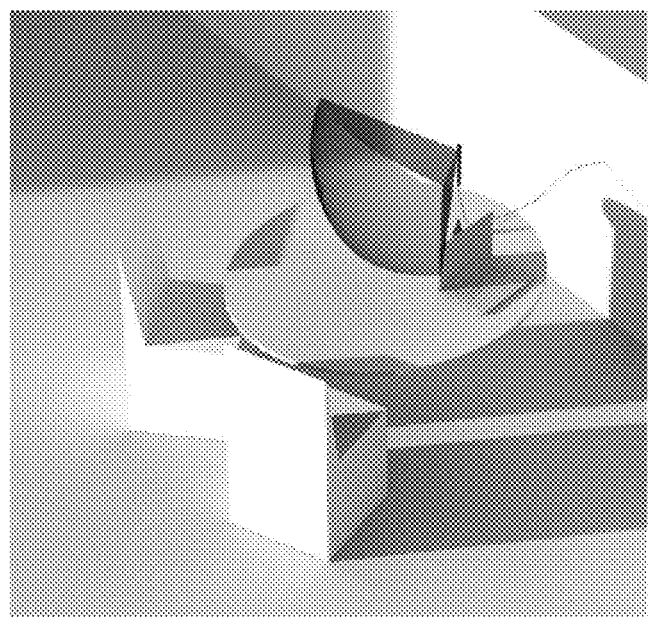
Figure 8D:
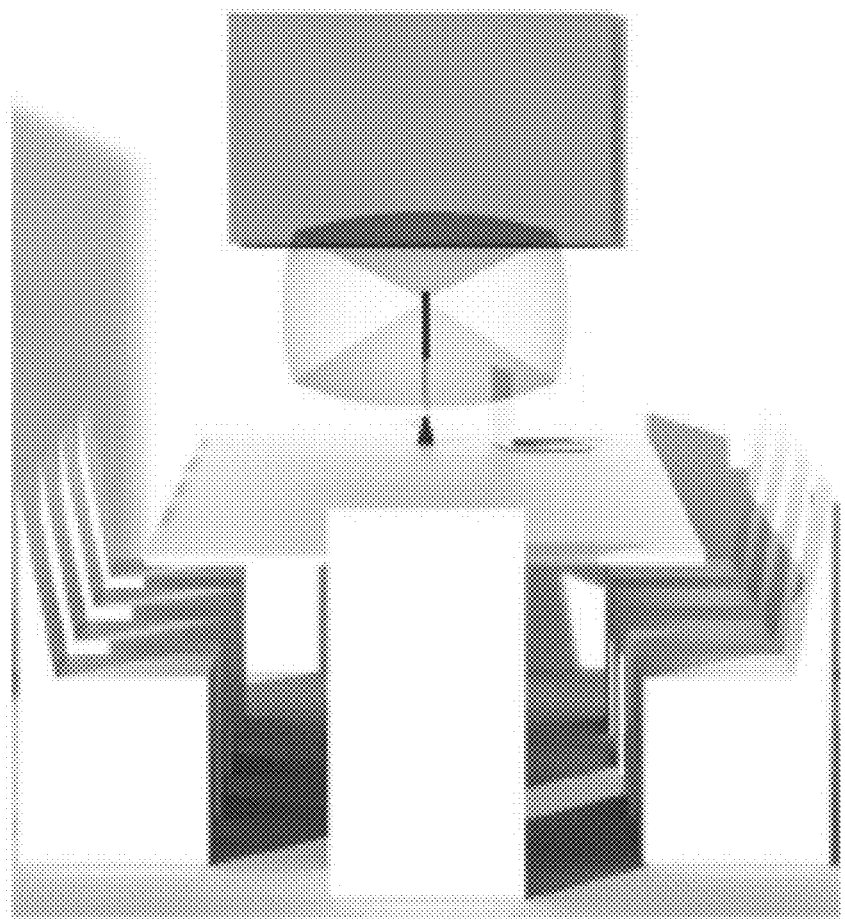

Reference now to FIG. 7, a camera device 10 showing details of two cameras, control buttons, status indicators and microphones, according to the present disclosure is provided. As shown in FIGS. 7A to 7C, the camera device 10 is configured to include a first camera having a wide angle lens 74 and a second camera having a long focus lens 72 each of which is housed within and fixed to the camera housing 18. The camera device 10 is further configured to include a microphone 106 housed in inside and fixed to the camera housing 18. The camera device 10 is further configured to include three light-emitting diode (LED) lights: a first LED light 102 to indicate the status of the camera 72, and a second LED light 104 to indicate the status of the camera 74, and a third LED light to indicate the on or off status of the microphone 106. The camera device 10 is further configured to include a camera switch 110, a microphone switch, a switch to turn or flip the cameras at 180 degree, and a switch to turn on or off of the A.I. noise reduction function.

Reference now to FIG. 8, a camera device 10 having multiple cameras, according to the present disclosure is provided. As shown in FIGS. 8A to 8C, the second camera having a long focus lens 72 is in a portrait orientation with a horizontal field of view (HFOV) in a range of about 17 degree to about 50 degree, such as about 43 degree; and the first camera having a wide angle lens 74 has a vertical wide angle in a range of about 60 degree to about 100 degree, such as about 90 degree. The second camera having a long focus lens 72 captures a single user's face and shoulder, similar to the front camera on a mobile phone and also puts the user up and center on the displays. The second camera having a long focus lens 72 can also be positioned in front of a computer screen or a display screen to improve eye contact during conversation in the video conference. The first camera having a wide angle lens 74 is ideal for capturing a bigger group of people during a video conference. The camera device can slide up and down to adjust to the eye line of the user.

Figure 9A:
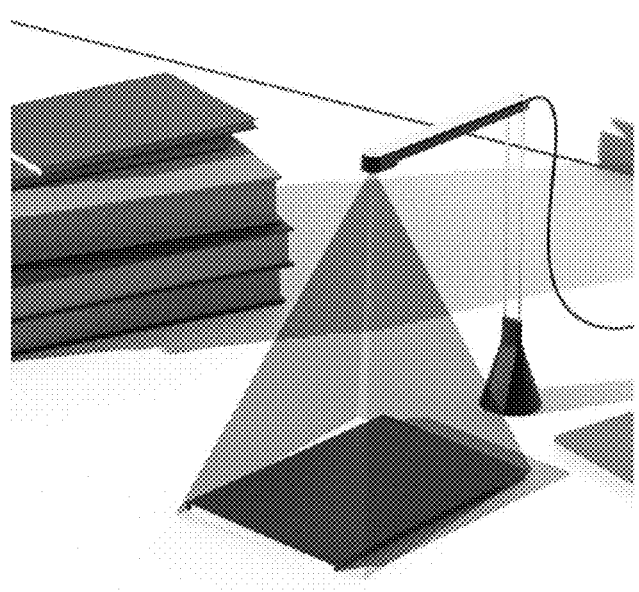
FIGS. 9A and 9B show one embodiment of the camera device in document camera mode with narrow and wide views, in accordance with at least one non-limiting aspect of the present disclosure.
Figure 9B:
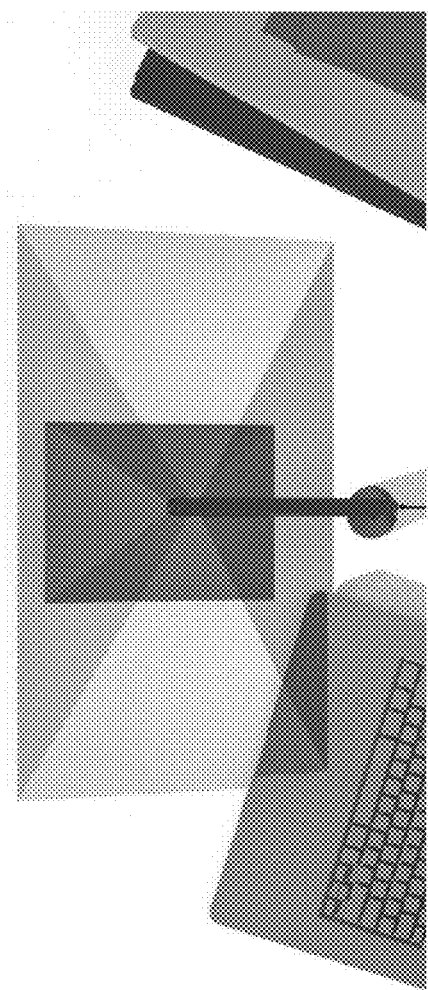

Reference now to FIG. 9, a camera device 10 used as a document camera, according to the present disclosure is provided. As shown in FIGS. 9A to 9B, When the camera sliding body 14 slides up to the highest position, the camera device 10 is configured for the camera sliding body 14 to flip to the front at different angles; and is further configured to stop at about 45 degree showing an overview of the desk and also to stop at about 90 degree (parallel to the surface of a table or desk) allowing the user to share a document or a work in process (such as drawing a picture).

The camera device of the present disclosure can include additional cameras having a long focus lens to provide views of different portions of the space.

There are several advantages to the camera system and related techniques presented herein. As one example, the camera device and system presented herein enables the camera device to be used both as a video camera to provide wide views of a space and views of different portions of the space and as a document camera to provide a close and detailed view of a document or a work in process at a low cost. The camera device and system disclosed herein also enables fast and flexible speaker tracking, without mechanical wear and tear of components and, thus, provide an unobtrusive near end meeting experience, and also improves the speaker tracking experience for far end participants, as the far end users do not need to watch the camera rotate into a new position and zoom in.

EXAMPLES

In various aspects, the present disclosure provides a camera device for video conferences, the camera device comprising: a first camera having a wide angle lens to provide a wide overall view of a space; a second camera having a long focus lens to provide a narrow view of a first portion of the space; and a mechanical assembly, wherein the first and second cameras are housed within and attached to the mechanical assembly, and wherein the mechanical assembly is configured to enable each of the first and second cameras to operate as a video camera to provide the wide overall and narrow views of the space and as a document camera to provide a close view of a document. The narrow view of the first portion of the space may be contained in the wide overall view of the space, such as a narrow view of the center portion of the space. The wide overall view and narrow view of the space is in a first direction. The close or detailed view of a document is in a second direction. The first direction is different from the second direction. The first direction and second direction may have an angle in a range of about 0-90 degree, such as about 40-50 degree, about 45 degree, about 80-100 degree, or about 90 degree.

In various aspects, the mechanical assembly comprises a base; a camera sliding body comprising a camera housing and a plate; and a wire rail configured to attach to the base, wherein the mechanical assembly is configured to sandwich the wire rail between the camera housing and the plate, the camera housing and the plate are configured to be attached to each other, and the mechanical assembly is configured to allow the camera sliding body to slide up and down along the wire rail so that the first and second cameras are adjustable to be positioned at different heights.

In various aspects, the first and second cameras are housed within and attached to the camera housing. The first and second cameras are located on the top end of the front side of the camera housing and faces the front of the camera devices.

In various aspects, the camera housing and the plate are configured to be attached to each other by screws, such as a first screw at a top end and a second screw at a bottom end of the camera sliding body.

In various aspects, the camera housing further comprises a first guide configured to attach to a rear side of the camera housing facing the wire rail, the wire rail comprises two parallel sides perpendicular to a flat bottom surface of the base and a top side, the top side includes a first notch, and the mechanical assembly is configured for the camera sliding body to slide along the wire rail through the first guide against the first notch and for the first guide to press against the first notch to provide friction to hold the camera sliding body in position so that the camera sliding body can sit stably at any locations along the wire rail.

In various aspects, the camera housing further comprises a second guide configured to attach to the rear side of the camera housing facing the wire rail, the top side of the wire rail includes a second notch, the second guide is configured to fit into the second notch of the wire rail to keep the camera sliding body vertically centered on the wire rail.

In various aspects, the first guide is made of a polyurethane elastomer.

In various aspects, the first guide is made of a polyurethane elastomer having a kinetic coefficient of friction in a range of about 0.2-2.5 and a static coefficient of friction in a range of about 0.3-2.5 as measured according to the ASTM D1894 standard.

In various aspects, the second guide is made of a polycarbonate polymer.

In various aspects, the mechanical assembly is configured to enable the camera sliding body to flip to a front of the camera device at an angle in a range of about 0-90° from the original position of the camera sliding body when the camera sliding body slides to the top end of the wire rail.

In various aspects, the mechanical assembly is configured to enable the camera sliding body to flip to the front at the flipping angle in the range of about 0-90° from the original position of the camera sliding body when the camera sliding body slides to the top end of the wire rail, and to stop at a flipping angle in a range of about 0-90° from the original position of the camera sliding body.

In various aspects, the mechanical assembly is configured to enable the camera sliding body to flip to the front and stop at the flipping angle of about 45° from the original position of the camera sliding body.

In various aspects, the mechanical assembly is configured to enable the camera sliding body to flip to the front and stop at the flipping angle of about 90° from the original position of the camera sliding body.

In various aspects, the camera housing further comprises a pin and a U shape loop both of which are configured to attach to the camera housing, and the pin is placed inside the loop, the pin and the U shape loop are configured to enable the camera sliding body to stop at the flipping angle of 45° from the original position of the camera sliding body.

In various aspects, the camera housing comprises two side wings, and the mechanical assembly is configured so that two bottom edges of the two side wings of the camera housing enable the camera sliding body to stop at the flipping angle of about 90° from the original position of the camera sliding body.

In various aspects, the narrow view of the first portion of the space is contained within the wide overall view of the space.

In various aspects, the camera device further comprises a third camera having a long focus lens housed within and attached to the camera housing to provide a narrow view of a second portion of the space which overlaps and is different from the narrow view of the first portion of the space.

In various aspects, the camera device further comprises a fourth camera having a long focus lens housed within and attached to the camera housing to provide a narrow view of a third portion of the space which overlaps and is different from the narrow views of the first portion of the space.

In various aspect, the present disclosure provides a camera system for video conferences, the camera system comprising: a camera device comprising a first camera having a wide angle lens to provide a wide overall view of a space, a second camera having a long focus lens to provide a narrow view of a first portion of the space, and a mechanical assembly; and a processor operatively coupled to each of the first and second cameras, wherein the first and second cameras are housed within and attached to the mechanical assembly, wherein the mechanical assembly is configured to enable each of the first and second cameras to serve as a video camera to provide wide overall and narrow views of the space and also as a document camera to provide a close view of a document, wherein the first camera is configured to produce a first video signal and the second camera is configured to produce a second video signal, and wherein the processor is configured to receive the first and second video signals, select a relevant video signal from the first and second video signals, and process the relevant video signal by digitally panning, tilting, and zooming of the relevant video signal to generate a video stream from the processed video signals.

In various aspects, the processor is further configured to control the camera device to track a talking participant and follow the tracked talking participant during the video conferences.

In various aspects, the camera device further comprise a third camera having a long focus lens configured to output a third video signal, and the processor is configured to: receive the third video signal; select a first relevant video signal and a second relevant video signal from the first video signal, the second video signal, and the third video signal, the second relevant video signal being different from the first relevant signal; and generate a dual stream video stream including a first stream generated based on the first relevant video signal and a second stream generated based on the second relevant video signal.

In various aspects, the camera device further comprise a third camera having a long focus lens configured to output a third video signal and a fourth camera having a long focus lens configured to output a fourth video signal, and the processor is configured to: receive the third and fourth video signals; select a first relevant video signal and a second relevant video signal from the first video signal, the second video signal, the third video signal, and the fourth video signal, the second relevant video signal being different from the first relevant signal; and generate a dual stream video stream including a first stream generated based on the first relevant video signal and a second stream generated based on the second relevant video signal.

All patents, patent applications, publications, or other disclosure material mentioned herein and/or listed in any Application Data Sheet, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present disclosure has been described with reference to various exemplary and illustrative aspects. The aspects described herein are understood as providing illustrative features of varying detail of various aspects of the present disclosure; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the present disclosure. Accordingly, it will be recognized by persons having ordinary skill in the art that various substitutions, modifications or combinations of any of the exemplary aspects may be made without departing from the scope of the present disclosure. In addition, persons skilled in the art will recognize, or be able to ascertain using no more than routine experimentation, many equivalents to the various aspects of the present disclosure described herein upon review of this specification. Thus, the present disclosure is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

Various changes and modifications to the presently preferred embodiments disclosed herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A camera device for video conferences, the camera device comprising:
   a first camera having a wide angle lens to provide a wide overall view of a space;
   a second camera having a long focus lens to provide a narrow view of a first portion of the space; and
   a mechanical assembly comprising:
      a base;
      a camera sliding body comprising a camera housing and a plate; and
      a wire rail configured to attach to the base, wherein the mechanical assembly is configured to sandwich the wire rail between the camera housing and the plate, wherein the camera housing and the plate are configured to attach to each other, wherein the first and second cameras are housed within and attached to the camera housing, and wherein the mechanical assembly is configured to slide the camera sliding body along the wire rail; and
   wherein the mechanical assembly is configured to enable each of the first and second cameras to operate as a video camera to provide the wide overall and narrow views of the space and as a document camera to provide a close view of a document.

2. The camera device according to claim 1, wherein the camera sliding body comprises a first end and a second end opposite the first end, and wherein the camera housing and the plate are configured to attach to each other by a first screw at the first end of the camera sliding body and a second screw at the second end of the camera sliding body.

3. The camera device according to claim 1, wherein the camera housing further comprises a first guide configured to attach to a side of the camera housing facing the wire rail, wherein the wire rail comprises a first portion, a second portion, and a third portion, wherein the first portion and the second portion are parallel to each other and extend from the base, wherein the third portion is perpendicular to and connects the first portion and the second portion, wherein the third portion includes a first notch, and wherein the first guide is configured to press against the first notch to provide friction to hold the camera sliding body in any position along the wire rail.

4. The camera device according to claim 3, wherein the camera housing further comprises a second guide configured to attach to the side of the camera housing facing the wire rail, wherein the third portion of the wire rail includes a second notch, wherein the second guide is configured to fit into the second notch of the wire rail to prevent the camera sliding body from moving perpendicularly to the first portion and the second portion of the wire rail.

5. The camera device according to claim 4, wherein the second guide is made of a polycarbonate polymer.

6. The camera device according to claim 3, wherein the first guide is made of a polyurethane elastomer.

7. The camera device according to claim 3, wherein the first guide is made of a polyurethane elastomer having a kinetic coefficient of friction in a range of about 0.2-2.5 and a static coefficient of friction in a range of about 0.3-2.5 as measured according to the ASTM D1894 standard.

8. The camera device according to claim 1, wherein the mechanical assembly is configured to enable the camera sliding body to flip about an axis defined by the third portion of the wire rail at an angle in a range of about 0-90° when the camera sliding body slides to an end position along the wire rail defined by the third portion of the wire rail.

9. The camera device according to claim 8, wherein the mechanical assembly is configured to enable the camera sliding body to hold a position at a flipping angle in a range of about 0-90°.

10. The camera device according to claim 8, wherein the mechanical assembly is configured to enable the camera sliding body to hold a position at a flipping angle of about 45°.

11. The camera device according to claim 10, wherein the camera housing further comprises a pin and a U-shaped loop, wherein both the pin and the U-shaped loop are configured to attach to the camera housing, wherein the pin is placed inside the U-shaped loop, wherein the pin and the U-shaped loop are configured to enable the camera sliding body to hold the position at the flipping angle of about 45°.

12. The camera device according to claim 8, wherein the mechanical assembly is configured to enable the camera sliding body to hold a position at a flipping angle of about 90°.

13. The camera device according to claim 12, wherein the camera housing comprises two side wings, wherein each of the two side wings comprise an edge, and wherein the mechanical assembly is configured so that the edges of the two side wings enable the camera sliding body to hold the position at the flipping angle of about 90°.

14. The camera device according to claim 1, wherein the narrow view of the first portion of the space is contained within the wide overall view of the space.

15. The camera device according to claim 1, wherein the camera device further comprises a third camera having a long focus lens housed within and attached to the camera housing to provide a narrow view of a second portion of the space which overlaps and is different from the narrow view of the first portion of the space.

16. The camera device according to claim 15, wherein the camera device further comprises a fourth camera having a long focus lens housed within and attached to the camera housing to provide a narrow view of a third portion of the space which overlaps and is different from the narrow view of the first portion of the space.

17. A camera system for video conferences, the camera system comprising:
   a camera device, the camera device comprising:
      a first camera having a wide angle lens to provide a wide overall view of a space and a second camera having a long focus lens to provide a narrow view of a first portion of the space; and
      a mechanical assembly comprising:
         a base;
         a camera sliding body comprising a camera housing and a plate; and
         a wire rail configured to attach to the base, wherein the mechanical assembly is configured to sandwich the wire rail between the camera housing and the plate, wherein the camera housing and the plate are configured to attach to each other, wherein the first and second cameras are housed within and attached to the camera housing, wherein the mechanical assembly is configured to slide the camera sliding body along the wire rail, and wherein the mechanical assembly is configured to enable each of the first and second cameras to serve as a video camera to provide the wide overall and narrow views of the space and also as a document camera to provide a close view of a document;
      wherein the first camera is configured to produce a first video signal and the second camera is configured to produce a second video signal; and
   a processor operatively coupled to each of the first and second cameras, wherein the processor is configured to: receive the first and second video signals, select a relevant video signal from the first and second video signals, and process the relevant video signal by digitally panning, tilting, and zooming of the relevant video signal to generate a video stream from the processed video signals.

18. The camera system according to claim 17, wherein the processor is further configured to control the camera device to track a talking participant and follow the tracked talking participant during the video conferences.

19. The camera system according to claim 17, wherein the camera device further comprises a third camera having a long focus lens configured to output a third video signal and a fourth camera having a long focus lens configured to output a fourth video signal, and the processor is configured to: receive the third and fourth video signals; select a first relevant video signal and a second relevant video signal from the first video signal, the second video signal, the third video signal, and the fourth video signal, the second relevant video signal being different from the first relevant signal; and generate a dual stream video stream including a first stream generated based on the first relevant video signal and a second stream generated based on the second relevant video signal.

* * * * *